United States Patent
Nakade

(10) Patent No.: US 9,908,529 B2
(45) Date of Patent: Mar. 6, 2018

(54) VEHICLE SPEED CONTROL APPARATUS, AND VEHICLE

(71) Applicant: TOYOTA JIDOSHA KABUSHIKI KAISHA, Toyota-shi, Aichi-ken (JP)

(72) Inventor: Yusuke Nakade, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 15/097,686

(22) Filed: Apr. 13, 2016

(65) Prior Publication Data

US 2016/0339912 A1  Nov. 24, 2016

(30) Foreign Application Priority Data

May 19, 2015  (JP) .................................. 2015-102173

(51) Int. Cl.
*B60W 30/14*  (2006.01)

(52) U.S. Cl.
CPC ....... *B60W 30/146* (2013.01); *B60W 2550/22* (2013.01); *B60W 2720/10* (2013.01)

(58) Field of Classification Search
CPC .............................. B60W 30/146; B60K 31/00
See application file for complete search history.

(56) References Cited

U.S. PATENT DOCUMENTS

| | | | | |
|---|---|---|---|---|
| 6,901,325 B2 * | 5/2005 | Kustosch | ............. | B60K 31/047 701/93 |
| 8,041,493 B2 | 10/2011 | Seto et al. | | |
| 8,396,640 B2 * | 3/2013 | Yuzawa | ................. | B60W 10/06 701/93 |
| 8,948,988 B2 * | 2/2015 | Kojima | ............. | F16H 61/66259 477/94 |
| 2004/0049333 A1 * | 3/2004 | Kustosch | ............. | B60K 31/047 701/93 |
| 2008/0270001 A1 * | 10/2008 | Seto | ........................ | B60K 31/00 701/93 |
| 2011/0160978 A1 * | 6/2011 | Yuzawa | ................. | B60W 10/06 701/93 |
| 2012/0245808 A1 * | 9/2012 | Shiraki | ................. | F02D 41/021 701/51 |
| 2013/0085655 A1 | 4/2013 | Kii et al. | | |

(Continued)

FOREIGN PATENT DOCUMENTS

| | | | |
|---|---|---|---|
| JP | 2005-128790 A | 5/2005 | |
| JP | 2006-168593 A | 6/2006 | |

(Continued)

*Primary Examiner* — Alex C Dunn
(74) *Attorney, Agent, or Firm* — Oliff PLC

(57) ABSTRACT

A vehicle speed control apparatus generate a speed command value to control a vehicle speed according to a detected treading amount of an accelerator pedal, determines an upper-limit speed of the vehicle according to a speed limit of a road, generates a limit command value to control the vehicle speed to be the upper-limit speed, and adjusts the vehicle speed according to one of the speed command value and the limit command value to cause the lower vehicle speed. If the upper-limit speed is updated due to a change in the speed limit of the road while the vehicle speed is being adjusted according to the limit command value, a rate of change of the vehicle speed is limited continuously until a predetermined timing.

6 Claims, 8 Drawing Sheets

(56) References Cited

U.S. PATENT DOCUMENTS

| | | | | |
|---|---|---|---|---|
| 2013/0304358 A1* | 11/2013 | Matsunaga | ............ | F02D 41/00 |
| | | | | 701/110 |
| 2015/0134168 A1* | 5/2015 | Kawakami | ............ | B60K 6/485 |
| | | | | 701/22 |
| 2015/0203116 A1* | 7/2015 | Fairgrieve | ....... | B60W 30/18172 |
| | | | | 701/93 |

FOREIGN PATENT DOCUMENTS

| | | |
|---|---|---|
| JP | 2007-326429 A | 12/2007 |
| JP | 2015-020636 A | 2/2015 |

* cited by examiner

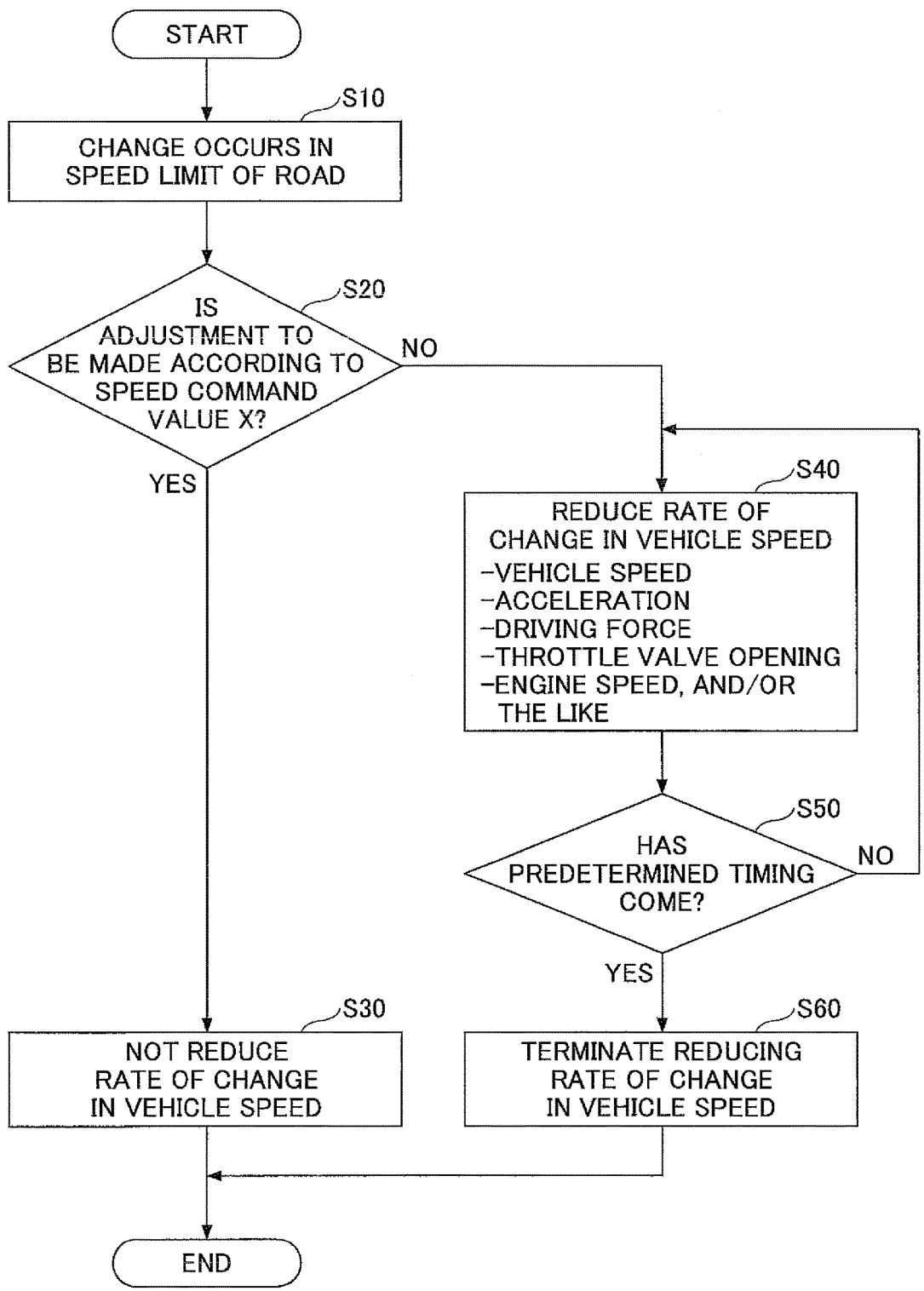

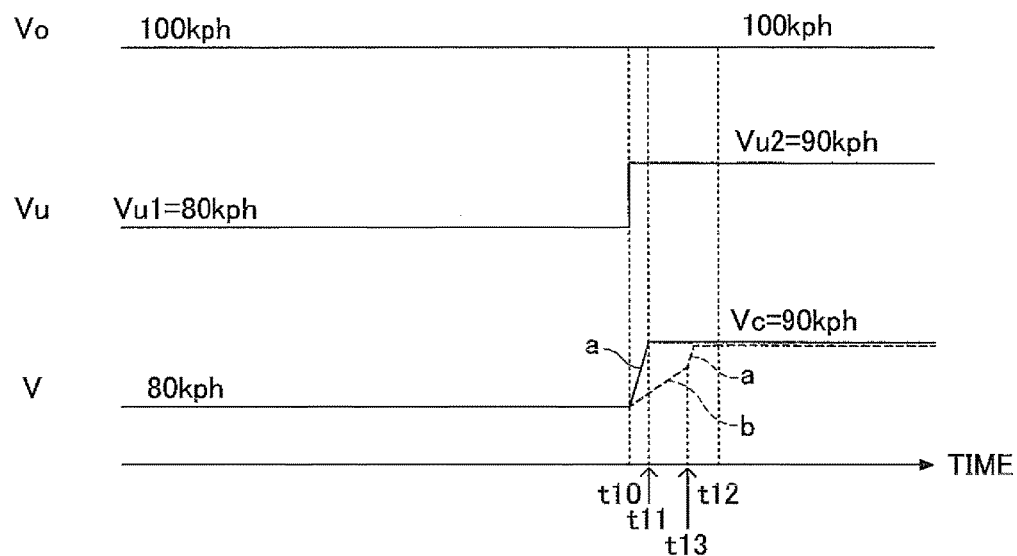
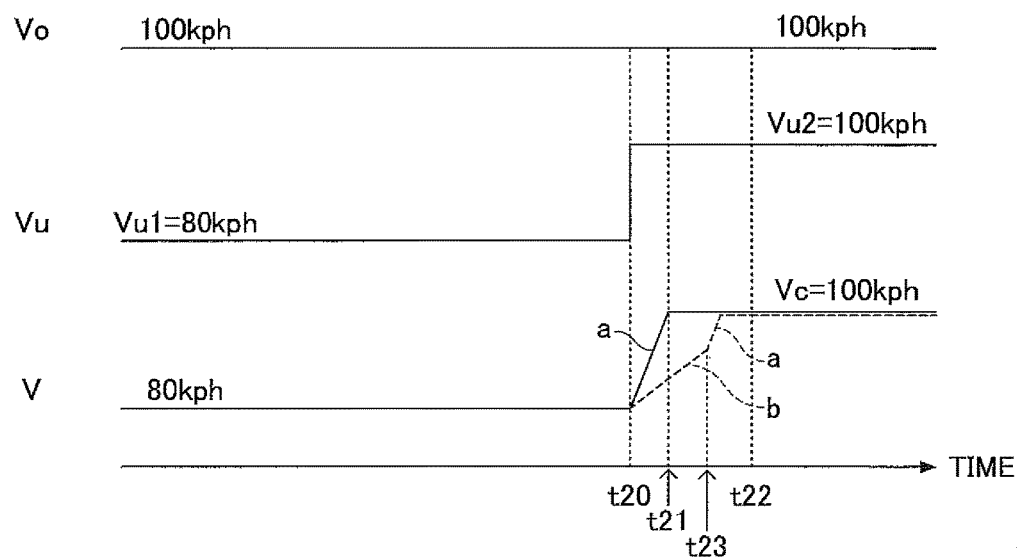

VEHICLE SPEED CONTROL APPARATUS, AND VEHICLE

The present application is based on and claims the benefit of priority of Japanese Priority Application No. 2015-102173, filed on May 19, 2015, the entire contents of which are hereby incorporated herein by reference.

BACKGROUND

1. Technical Field

The present disclosure relates to a vehicle speed control apparatus, and a vehicle.

2. Description of the Related Art

In the related art, a speed control apparatus is known which determines the speed limit of a road, and makes the vehicle speed to fall within the determined speed limit (for example, see Japanese Laid-Open Patent Application No. 2005-128790).

SUMMARY

According to one aspect, a vehicle speed control apparatus includes one or more processors configured to carry out generating a speed command value to control a vehicle speed according to a detected treading amount of an accelerator pedal; determining an upper-limit speed of the vehicle according to a determined speed limit of a road; generating a limit command value to control the vehicle speed to be the upper-limit speed determined by the determining; and adjusting the vehicle speed according to one of the speed command value and the limit command value to cause the lower vehicle speed. If the determining updates the upper-limit speed due to a change in the speed limit of the road while the adjusting is adjusting the vehicle speed according to the limit command value, the adjusting limits a rate of change of the vehicle speed continuously until a predetermined timing.

Other objects, features and advantages will become more apparent from the following detailed description when read in conjunction with the accompanying drawings.

BRIEF DESCRIPTION OF THE DRAWINGS

FIG. 7 is a flowchart illustrating one example of operations of the vehicle speed control apparatus;

FIG. 8 is a timing chart illustrating one example of a case where, while a vehicle speed is being adjusted according to a speed command value, an upper-limit speed is updated due to a change in the speed limit;

FIG. 9 is a timing chart illustrating one example of a case where, while a vehicle speed is being adjusted according to a speed command value, an upper-limit speed is updated due to a change in the speed limit;

DETAILED DESCRIPTION OF EMBODIMENTS

For the purpose of convenience, the description of the above-mentioned related art will be continued first.

In a speed control apparatus such as that described above, even if an amount of treading on (i.e., a treading amount of) the accelerator pedal is so great as to exceed the determined speed limit of the road, the vehicle speed is kept within the determined speed limit. However, if the speed limit of the road on which the vehicle is traveling rises under the condition where the driver is treading on the accelerator pedal expecting that the vehicle speed will be kept within the speed limit of the road, the vehicle may automatically start accelerating depending on the treading amount of the accelerator pedal.

In the same way, if the speed limit of the road on which the vehicle is traveling falls under the condition where the driver is treading on the accelerator pedal expecting that the vehicle speed will be kept within the speed limit of the road, the vehicle may automatically start decelerating.

In a case where the vehicle speed thus automatically starts changing due to a change in the speed limit of the road while the accelerator pedal is being trodden so much as to exceed the determined speed limit of the road, the driver who expects that the vehicle speed will be kept constant may feel something is wrong.

Therefore, an object of the embodiments is to provide a vehicle speed control apparatus capable of easing a driver's feeling something is wrong even if the vehicle speed automatically starts changing due to a change in the speed limit of the road, while the accelerator pedal is being trodden so much as to exceed the determined speed limit of the road and the vehicle speed is kept constant.

Below, embodiments will be described using the drawings.

Figure 1A:
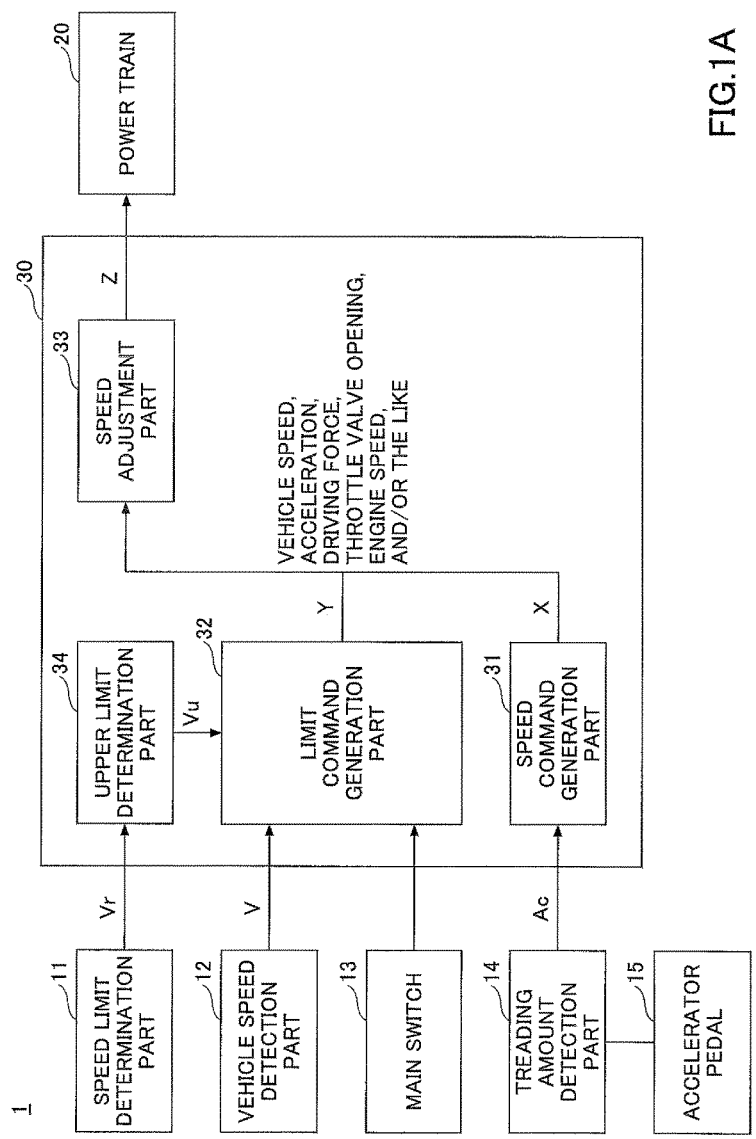
FIG. 1A is a configuration diagram illustrating one example of a vehicle including a vehicle speed control apparatus.

FIG. 1A is a configuration diagram illustrating a vehicle 1 including a vehicle speed control apparatus 30. The vehicle speed control apparatus 30 is one example of an apparatus limiting the speed of the vehicle 1 in such a manner as to not exceed an upper-limit speed determined according to a determined speed limit of the road. The vehicle 1 includes, for example, a speed limit determination part 11, a vehicle speed detection part 12, a main switch 13, an accelerator pedal 15, a treading amount detection part 14, a vehicle speed control apparatus 30, and a power train 20.

The speed limit determination part 11 determines the speed limit Vr of a road. The speed limit determination part 11 includes, for example, a camera taking a picture in front of the vehicle 1, and an image recognition part recognizing an image of a road sign or the speed limit Vr indicated on the road sign from the thus taken picture. Alternatively, the speed limit determination part 11 can be such (for example, a car navigation apparatus having a route search function, and so forth) as to include, for example, a memory storing the speed limit Vr of each road, and a part extracting, from the memory, the speed limit Vr of the road corresponding to the current position of the vehicle 1.

The vehicle speed detection part 12 is one example of a sensor detecting the vehicle speed V of the vehicle 1. As an actual example of the vehicle speed detection part 12, a wheel speed sensor monitoring the rotations of the wheels and thus detecting the vehicle speed V can be cited.

The main switch 13 is one example of a switch enabling selecting whether to activate such control (i.e., vehicle speed limit control) as to limit the vehicle speed V to not exceed the upper-limit speed determined by the upper limit determination part 34 according to the determined speed limit Vr of the road. The driver can select whether to activate the vehicle speed limit control by operating the main switch 13.

The treading amount detection part 14 is one example of a sensor detecting the treading amount Ac of the accelerator pedal 15 trodden by the driver. The treading amount Ac is equivalent to the treading amount of the accelerator pedal 15 trodden by the driver.

The vehicle speed control apparatus 30 carries out the vehicle speed limit control if activation of the vehicle speed limit control is selected via the main switch 13. The vehicle speed control apparatus 30 includes a speed command generation part 31, an upper limit determination part 34, a limit command generation part 32, and a speed adjustment part 33. The vehicle speed control apparatus 30 is, for example, an electronic control unit (ECU) including a microcomputer, as will be described later using FIG. 13, implementing the speed command generation part 31, the upper limit determination part 34, the limit command generation part 32, and the speed adjustment part 33.

The speed command generation part 31 generates a speed command value X controlling the vehicle speed V according to the treading amount Ac of the accelerator pedal 15 detected by the treading amount detection part 14.

The upper limit determination part 34 determines an upper-limit speed Vu of the vehicle 1 according to the determined speed limit Vr of the road determined by the speed limit determination part 11. The upper limit determination part 34 determines the upper-limit speed Vu to be such a value that the difference from the speed limit Vr is less than a predetermined value. In other words, the upper-limit speed Vu can be determined as the same value as the speed limit Vr, can be determined as a value acquired by adding a predetermined allowance to the speed limit Vr, or can be determined as a value acquired by subtracting a predetermined allowance from the speed limit Vr. For example, if the determined speed limit Vr is 80 kph, the upper limit determination part 34 can be such as to determine the upper-limit speed Vu as 80 kph, determine the upper-limit speed Vu as 82 kph, or determine the upper-limit speed Vu as 78 kph. Note that "kph" denotes "km/h".

The limit command generation part 32 generates a limit command value Y for controlling the vehicle speed V to be the upper-limit speed Vu determined by the upper limit determination part 34.

The speed adjustment part 33 outputs a control signal Z for adjusting the vehicle speed V according to a command value which is one of the speed command value X generated by the speed command generation part 31 and the limit command value Y generated by the limit command generation part 32. The one of the speed command value X generated by the speed command generation part 31 and the limit command value Y generated by the limit command generation part 32 is such a command value as to cause the vehicle to have the lower vehicle speed V.

For example, if such a command value as to cause the lower vehicle speed V is the speed command value X, the speed adjustment part 33 outputs the control signal for adjusting the vehicle speed V according to the speed command value X. Such a command value as to cause the lower vehicle speed V being the speed command value X means that the vehicle speed determined according to the treading amount Ac of the accelerator pedal 15 (hereinafter, referred to as an "accelerator treading amount corresponding speed Vo") is less than the upper-limit speed Vu. Therefore, if such a command value as to cause the lower vehicle speed V is the speed command value X, the speed adjustment part 33 can adjust the vehicle speed V in a speed range less than the upper-limit speed Vu without being limited by the upper-limit speed Vu, by adjusting the vehicle speed V according to the speed command value X.

On the other hand, if such a command value as to cause the lower vehicle speed V is the limit command value Y, the speed adjustment part 33 outputs the control signal Z for adjusting the vehicle speed V according to the limit command value Y. Such a command value as to cause the lower vehicle speed V being the limit command value Y means that the accelerator treading amount corresponding speed Vo is greater than the upper-limit speed Vu. Therefore, if such a command value as to cause the lower vehicle speed V is the limit command value Y, the speed adjustment part 33 adjusts the vehicle speed according to the limit command value Y so that a state where the vehicle speed V is limited to the upper-limit speed Vu is maintained.

On the other hand, if the vehicle speed V will be the same when using either the speed command value X or the limit command value Y, the speed adjustment part 33 outputs the control signal Z for adjusting the vehicle speed V according to a predetermined one of the speed command value X and the limit command value Y. The vehicle speed V being the same when using either the speed command value X or the limit command value Y means that the accelerator treading amount corresponding speed Vo is coincident with the upper-limit speed Vu. Therefore, if the vehicle speed V will be the same when using either the speed command value X or the limit command value Y, the speed adjustment part 33 adjusts the vehicle speed according to the predetermined one of the speed command value X and the limit command value Y so that a state where the vehicle speed V is limited to the upper-limit speed Vu is maintained.

For example, the speed command value X is a value controlling the vehicle speed V to be a target speed Vt corresponding to the treading amount Ac. In this case, the speed adjustment part 33 compares the target speed Vt with the upper-limit speed Vu, and the speed adjustment part 33 adjusts the vehicle speed V according to the speed command value X if the target speed Vt is less than the upper-limit speed Vu. On the other hand, the speed adjustment part 33 compares the target speed Vt with the upper-limit speed Vu, and the speed adjustment part 33 adjusts the vehicle speed V according to the limit command value Y if the target speed Vt is greater than or equal to the upper-limit speed Vu.

Also, for example, the speed command value X can be such a value as to indicate a target acceleration At controlling the vehicle speed V, and the limit command value Y can be such a value as to indicate a limit acceleration Ar controlling the vehicle speed V to be the upper-limit speed Vu. In this case, the speed adjustment part 33 compares the target acceleration At with the limit acceleration Ar, and adjusts the vehicle speed V according to the speed command value X if the target acceleration At is less than the limit acceleration Ar. On the other hand, the speed adjustment part 33 compares the target acceleration At with the limit acceleration Ar, and adjusts the vehicle speed V according to the limit command value Y if the target acceleration At is greater than or equal to the limit acceleration Ar. The target acceleration At and the limit acceleration Ar are accelerations of the vehicle 1 itself.

Also, for example, the speed command value X can be such a value as to indicate a target driving force Dt controlling the vehicle speed V, and the limit command value Y can be such a value as to indicate a limit driving force Dr controlling the vehicle speed V to be the upper-limit speed Vu. In this case, the speed adjustment part 33 compares the target driving force Dt with the limit driving force Dr, and adjusts the vehicle speed V according to the speed command value X if the target driving force Dt is less than the limit driving force Dr. On the other hand, the speed adjustment part 33 compares the target driving force Dt with the limit driving force Dr, and adjusts the vehicle speed V according to the limit command value Y if the target driving force Dt is greater than or equal to the limit driving force Dr. The target driving force Dt and the limit driving force Dr are driving outputs (torque) of a driving source driving the wheels of the vehicle 1 (for example, an engine, a motor, or the like).

Also, for example, the speed command value X can be such a value as to indicate a target throttle valve opening St controlling the vehicle speed V, and the limit command value Y can be such a value as to indicate a limit throttle valve opening Sr controlling the vehicle speed V to be the upper-limit speed Vu. In this case, the speed adjustment part 33 compares the target throttle valve opening St with the limit throttle valve opening Sr, and adjusts the vehicle speed V according to the speed command value X if the target throttle valve opening St is less than the limit throttle valve opening Sr. On the other hand, the speed adjustment part 33 compares the target throttle valve opening St with the limit throttle valve opening Sr, and adjusts the vehicle speed V according to the limit command value Y if the target throttle valve opening St is greater than or equal to the limit throttle valve opening Sr. The target throttle valve opening St and the limit throttle valve opening Sr are the openings of the throttle valve adjusting the intake air quantity of the engine of the vehicle 1.

Also, for example, the speed command value X can be such a value as to indicate a target engine speed Rt controlling the vehicle speed V, and the limit command value Y is such a value as to indicate a limit engine speed Rr controlling the vehicle speed V to be the upper-limit speed Vu. In this case, the speed adjustment part 33 compares the target engine speed Rt with the limit engine speed Rr, and adjusts the vehicle speed V according to the speed command value X if the target engine speed Rt is less than the limit engine speed Rr. On the other hand, the speed adjustment part 33 compares the target engine speed Rt with the limit engine speed Rr, and adjusts the vehicle speed V according to the limit command value Y if the target engine speed Rt is greater than or equal to the limit engine speed Rr. The target engine speed Rt and the limit engine speed Rr are the engine speeds of the vehicle 1.

The power train 20 is one example of a mechanism transmitting the power of at least one of the engine and the motor to the wheels of the vehicle 1 via a gearbox according to the control signal Z that is output from the speed adjustment part 33. The power train 20 includes, for example, at least one of the engine, the motor and the gearbox. As a result of the power train 20 transmitting the power to the wheels according to the control signal Z, the vehicle 1 can be accelerated or decelerated.

Figure 1B:
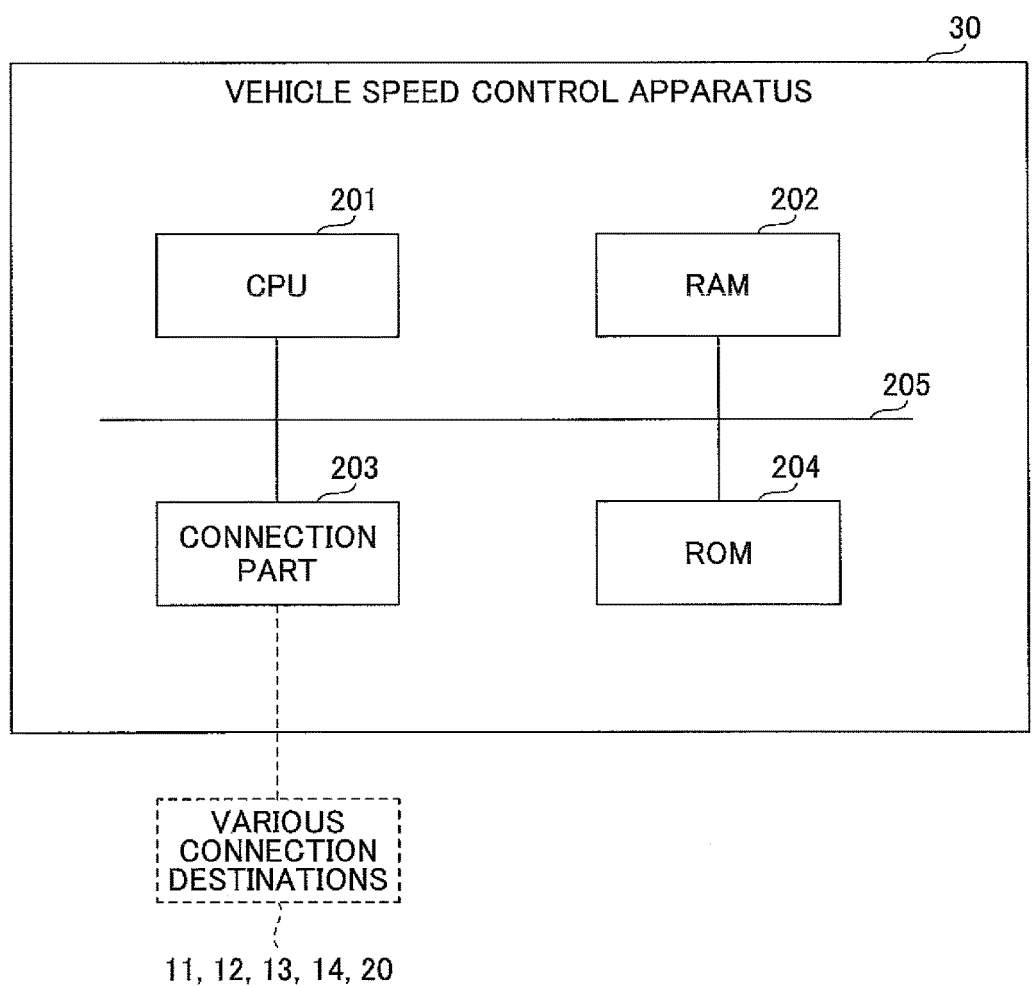
FIG. 1B illustrates one example of a hardware configuration of the vehicle speed control apparatus.

A hardware configuration of the vehicle speed control apparatus 30 will now be described. FIG. 1B illustrates one example of the hardware configuration of the vehicle speed control apparatus 30.

As shown in FIG. 1B, the vehicle speed control apparatus 30 includes a Central Processing Unit (CPU) 201, a Random Access Memory (RAM) 202, a connection part 203, and a Read-Only Memory (ROM) 204. Note that, the respective elements of the vehicle speed control apparatus 30 are mutually connected by a bus 205.

The CPU 201 executes a program stored by the ROM 204 to implement the speed command generation part 31, the upper limit determination part 34, the limit command generation part 32, and the speed adjustment part 33.

The RAM 202 is a main storage such as a Dynamic Random Access Memory (DRAM), a Static Random Access Memory (SRAM), or the like. The RAM 202 provides a work area where the program stored by the ROM 204 is expanded to be executed by the CPU 201. Also, the RAM 202 provides a storage area to temporarily store information generated as a result of the program stored by the ROM 204 being executed by the CPU 201.

The connection part 203 is an interface that is connected to various connection destinations such as the speed limit determination part 11, the vehicle speed detection part 12, the main switch 13, the treading amount detection part 14, and the power train 20, and sends and receives various information items among the various connection destinations.

The ROM 204 is a main storage such as an Erasable Programmable ROM (EPROM), an Electrically Erasable Programmable ROM (EEPROM), or the like, and stores the program to be executed by the CPU 201, and information used when the CPU 201 executes the program.

Figure 2:
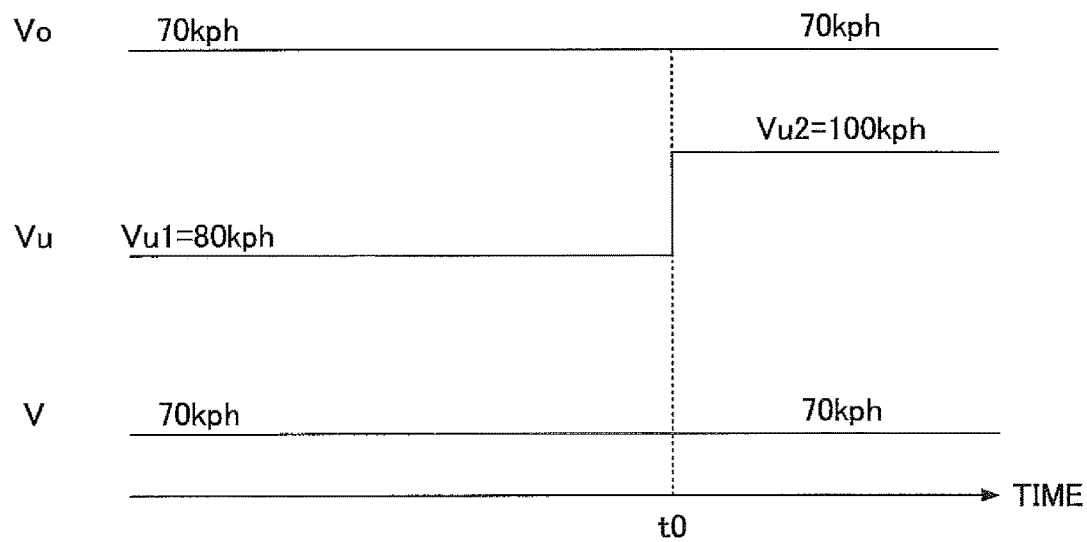
FIG. 2 is a timing chart illustrating one example of a case where, while a vehicle speed is being adjusted according to a speed command value, an upper-limit speed is updated due to a change in the speed limit.

FIG. 2 is a time chart illustrating one example of a case where, while the speed adjustment part 33 is adjusting the vehicle speed V according to the speed command value X, the upper-limit speed Vu is updated due to a change in the speed limit Vr at a timing to.

During a period of time before the timing t0, the accelerator treading amount corresponding speed Vo (=70 kph) is less than the upper-limit speed Vu before being updated, i.e., the value Vu1 (=80 kph). Therefore, the speed adjustment part 33 is adjusting the vehicle speed V according to the speed command value X. In other words, the vehicle speed V is being adjusted to be coincident with the accelerator treading amount corresponding speed Vo (=70 kph).

On the other hand, during the period of time after the timing t0, the accelerator treading amount corresponding speed Vo (=70 kph) is also less than the updated upper-limit speed Vu, i.e., the value Vu2 (=100 kph). Therefore, the speed adjustment part 33 is adjusting the vehicle speed V according to the speed command value X. In other words, the vehicle speed V is being adjusted to be coincident with the accelerator treading amount corresponding speed Vo (=70 kph).

Thus, in such a situation of FIG. 2, even if the upper-limit speed Vu rises at the timing t0, the vehicle speed V is kept at the accelerator treading amount corresponding speed Vo before and after the timing t0.

In contrast thereto, the speed adjustment part 33 changes the vehicle speed V at a rate of change "b" less than a rate of change "a" until a predetermined timing (see FIGS. 3-10), if, while the speed adjustment part 33 is adjusting the vehicle speed V according to the limit command value Y, the upper-limit speed Vu is updated by the upper limit determination part 34 due to a change in the speed limit Vr of the road. In other words, the speed adjustment part 33 limits the rate of change of the vehicle speed V until the predetermined timing. The "rate of change" denotes a variation of the vehicle speed V per a unit period of time. FIGS. 3-10 are timing charts respectively illustrating examples of cases where, while the speed adjustment part 33 is adjusting the vehicle speed V according to the limit command value Y, the upper-limit speed Vu is updated due to a change in the speed limit Vr of the road.

The rate of change "a" denotes a rate of change for when the speed adjustment part 33 changes the vehicle speed V from the upper-limit speed Vu before being updated, i.e., value Vu1, to the updated upper-limit speed Vu, i.e., a value Vu2 according to the speed command value X. In other words, the rate of change "a" denotes a rate of change for when the speed adjustment part 33 changes the vehicle speed V from the upper-limit speed Vu before being updated, i.e., the value Vu1 to the updated upper-limit speed Vu, i.e., the value Vu2 according to the treading amount Ac detected by the treading amount detection part 14. That is, the rate of change "a" denotes a rate of change of the vehicle speed V when the vehicle speed V is not limited by the upper-limit speed Vu. It is sufficient that the rate of change "b" is less than the rate of change "a".

Figure 3:
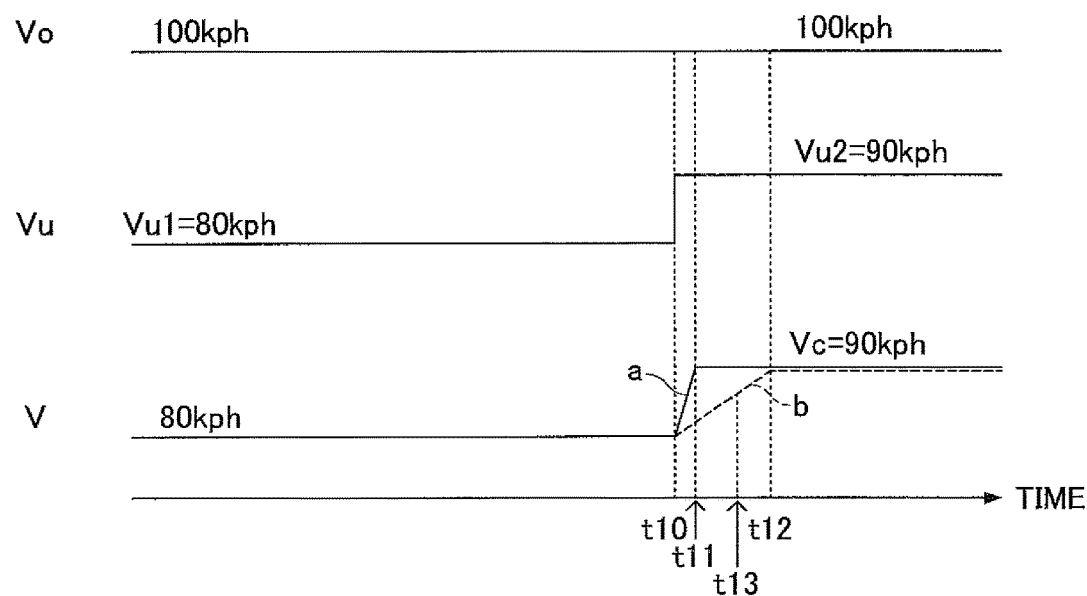
FIG. 3 is a timing chart illustrating one example of a case where, while a vehicle speed is being adjusted according to a speed command value, an upper-limit speed is updated due to a change in the speed limit.

In a case of FIG. 3, during a period of time before the timing t10 at which the upper-limit speed Vu is updated, the accelerator treading amount corresponding speed Vo (=100 kph) is greater than the upper-limit speed Vu before being updated, i.e., the value Vu1 (=80 kph). Therefore, the speed adjustment part 33 is adjusting the vehicle speed V according to the limit command value Y. In other words, the vehicle speed V at this time is kept at the upper-limit speed Vu (=80 kph) less than the accelerator treading amount corresponding speed Vo (=100 kph).

After the updating timing t10, the accelerator treading amount corresponding speed Vo (=100 kph) is still greater than the updated upper-limit speed Vu, i.e., the value Vu2 (=90 kph). Therefore, such a command value as to cause the lower vehicle speed is the limit command value Y. Therefore, the speed adjustment part 33 starts adjusting the vehicle speed V at the rate of change "b" less than the rate of change "a" from the updating timing t10 according to the limit command value Y so that the vehicle speed V will converge at the vehicle speed value Vc (in this case, 90 kph) to cause the lower vehicle speed.

The rate of change "a" at this time denotes a rate of change for when the speed adjustment part 33 changes the vehicle speed V according to the speed command value X from the upper-limit speed Vu before being updated, i.e., the value Vu1 (=80 kph) to the updated upper-limit speed Vu, i.e., the value Vu2 (=90 kph). Because the rate of change "b" is determined to be a value less than the rate of change "a", the period of time (t10-t12) required for the vehicle speed V to reach the vehicle speed value Vc at the rate of change "b" is longer than the period of time (t10-t11) required for the vehicle speed V to reach the vehicle speed value Vc at the rate of change "a". In other words, the vehicle speed V increasing at the rate of change "b" changes more gently than that of a case of increasing at the rate of change "a".

Thus, if, while the vehicle speed V is kept at the upper-limit speed Vu, the upper-limit speed Vu is updated due to a change in the speed limit Vr, the rate of an increasing change of the vehicle speed V is reduced to be the rate of change "b". In other words, even if the vehicle speed V automatically starts increasing in response to the upper-limit speed Vu being updated due to a change in the speed limit Vr of the road from a state where the vehicle speed V is kept at the upper-limit speed Vu less than the accelerator treading amount corresponding speed Vo, the rate of an increasing change of the vehicle speed V is reduced to be the rate of change "b". Thus, it is possible to ease a feeling of the driver that something is wrong.

Figure 4:
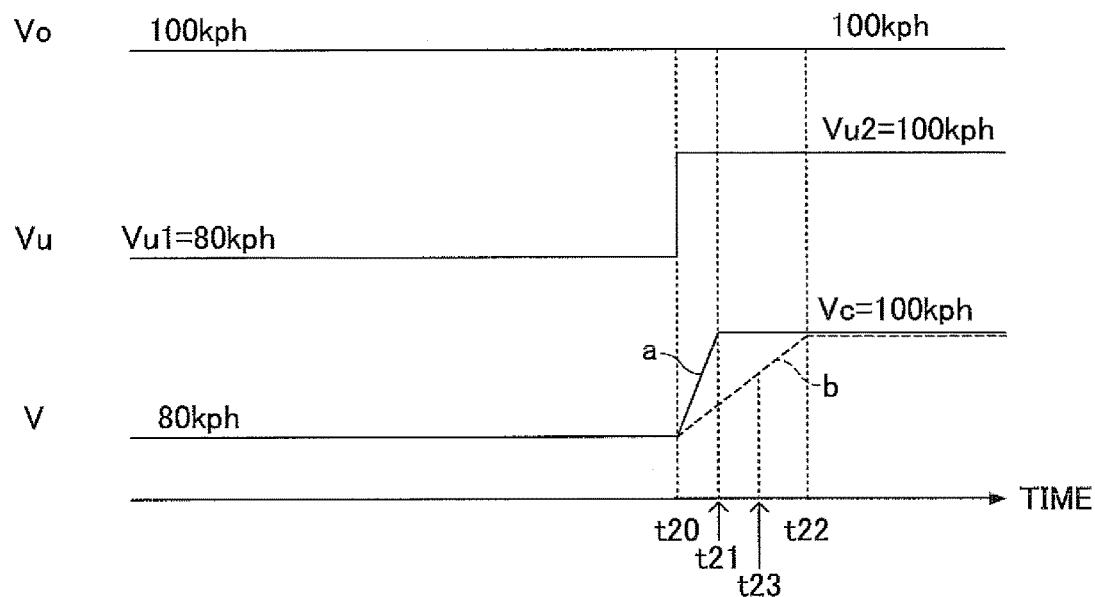
FIG. 4 is a timing chart illustrating one example of a case where, while a vehicle speed is being adjusted according to a speed command value, an upper-limit speed is updated due to a change in the speed limit.

In a case of FIG. 4, during a period before the timing t20 at which the upper-limit speed Vu is updated, the operations are the same as those of FIG. 3. After the updating timing t20, the accelerator treading amount corresponding speed Vo (=100 kph) is the same as the updated upper-limit speed Vu, i.e., the value Vu2 (=100 kph). Therefore, both the speed command value X and the limit command value Y cause the same vehicle speed value Vc. Therefore, the speed adjustment part 33 starts adjusting the vehicle speed V according to the speed command value X or the limit command value Y from the updating timing t20 in such a manner as to converge the vehicle speed V at the vehicle speed value Vc (in this case, 100 kph) at the rate of change "b" less than the rate of change "a".

The rate of change "a" at this time denotes a rate of change for when the speed adjustment part 33 changes the vehicle speed V according to the speed command value X from the upper-limit speed Vu before being updated, i.e., the value Vu1 (=80 kph) to the updated upper-limit speed Vu, i.e., the value Vu2 (=100 kph). Therefore, in the same manner as that of FIG. 3, because the rate of change "b" is determined to be less than the rate of change "a", the period of time (t20-t22) required for the vehicle speed V to reach the vehicle speed value Vc at the rate of change "b" is greater than the period of time (t20-t21) required for the vehicle speed V to reach the vehicle speed value Vc at the rate of change "a". In other words, the vehicle speed V increasing at the rate of change "b" changes more gently than that of a case of increasing at the rate of change "a". Therefore, it is possible to ease a feeling of the driver that something is wrong.

Figure 5:
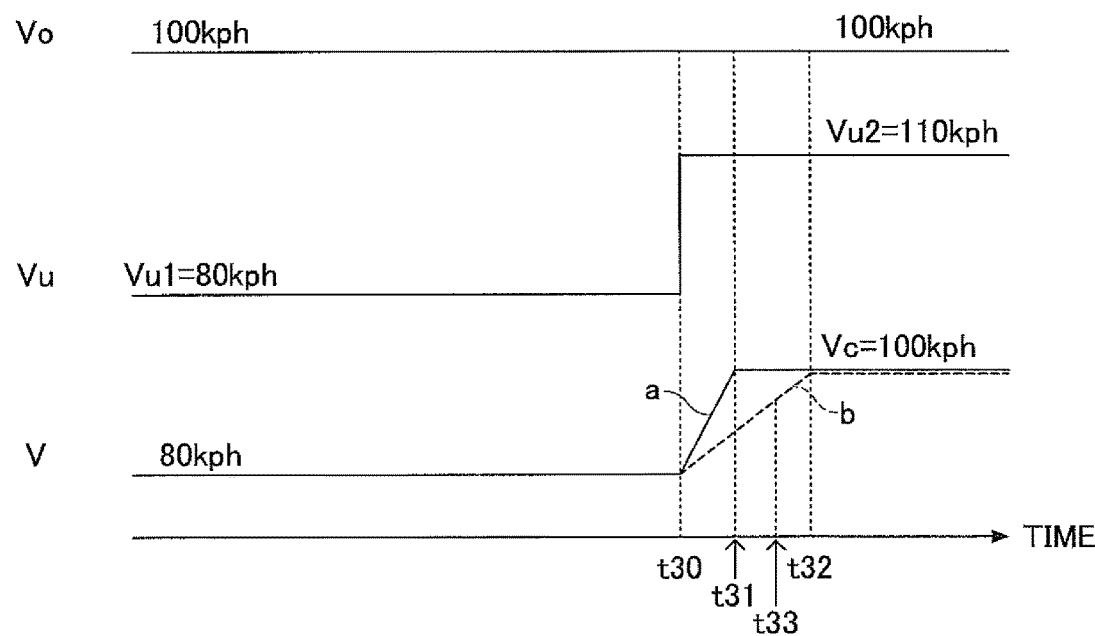
FIG. 5 is a timing chart illustrating one example of a case where, while a vehicle speed is being adjusted according to a speed command value, an upper-limit speed is updated due to a change in the speed limit.

In a case of FIG. 5, during a period of time before the timing t30 at which the upper-limit speed Vu is updated, the same operations as those of FIG. 3 are carried out. After the updating timing t30, the accelerator treading amount corresponding speed Vo (=100 kph) is less than the updated upper-limit speed Vu, i.e., the value Vu2 (=110 kph). Therefore, such a command value as to cause the lower vehicle speed V is the speed command value X. Therefore, the speed adjustment part 33 starts adjusting the vehicle speed V from the updating timing t30 according to the speed command value X at the rate of change "b" less than the rate of change "a" in such a manner as to converge the vehicle speed V at the vehicle speed value Vc (in this case, 100 kph) causing the lower vehicle speed V.

The rate of change "a" at this time denotes a rate of change for when the speed adjustment part 33 changes the vehicle speed V according to the speed command value X from the upper-limit speed Vu before being updated, i.e., the value Vu1 (=80 kph) to the updated upper-limit speed Vu, i.e., the value Vu2 (=110 kph). Therefore, in the same manner as that of FIG. 3, because the rate of change "b" is determined to be less than the rate of change "a", the period of time (t30-t32) required for the vehicle speed V to reach the vehicle speed value Vc at the rate of change "b" is greater than the period of time (t30-t31) required for the vehicle speed V to reach the vehicle speed value Vc at the rate of change "a". In other words, the vehicle speed V increasing at the rate of change "b" changes more gently than that of a case of increasing at the rate of change "a". Therefore, it is possible to ease a feeling of the driver that something is wrong.

Figure 6:
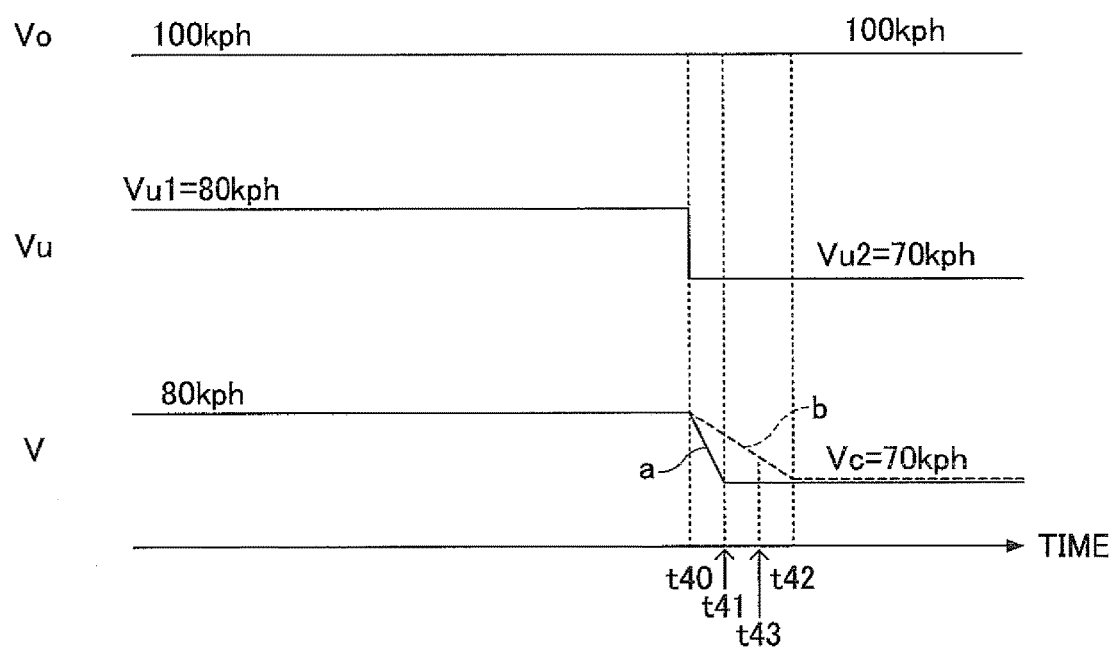
FIG. 6 is a timing chart illustrating one example of a case where, while a vehicle speed is being adjusted according to a speed command value, an upper-limit speed is updated due to a change in the speed limit.
Figure 10:
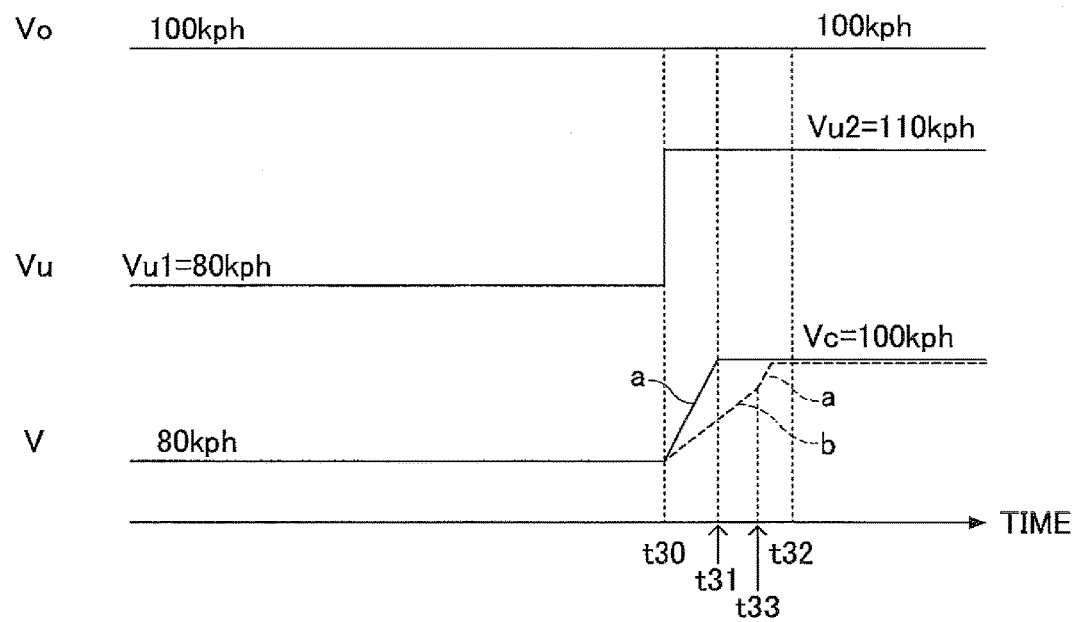
FIG. 10 is a timing chart illustrating one example of a case where, while a vehicle speed is being adjusted according to a speed command value, an upper-limit speed is updated due to a change in the speed limit.
Figure 11:
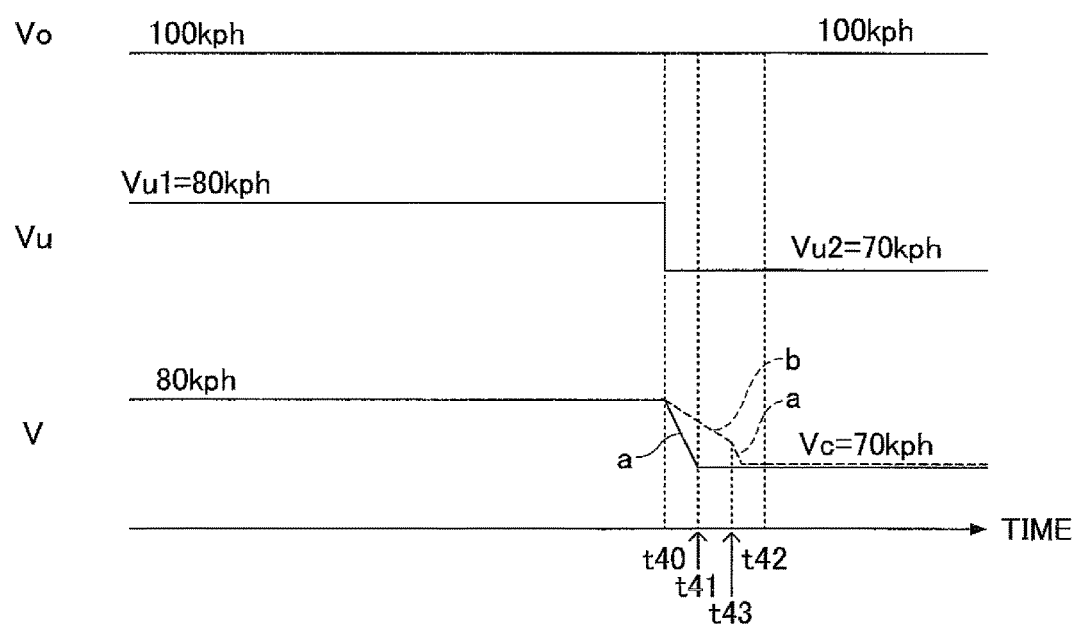
FIG. 11 is a timing chart illustrating one example of a case where, while a vehicle speed is being adjusted according to a speed command value, an upper-limit speed is updated due to a change in the speed limit.

In a case of FIG. 6, during a period of time before the timing t40 at which the upper-limit speed Vu is updated, the same operations as those of FIG. 3 are carried out. After the updating timing t40, because the accelerator treading amount corresponding speed Vo (=100 kph) is greater than the updated upper-limit speed Vu, i.e., the value Vu2 (=70 kph), such a command value as to cause the lower vehicle speed V is the limit command value Y. Therefore, the speed adjustment part 33 starts adjusting the vehicle speed V from the updating timing t40 according to the limit command value Y at the rate of change "b" less than the rate of change "a" in such a manner as to converge the vehicle speed V at the vehicle speed value Vc (in this case, 70 kph) causing the lower vehicle speed V.

The rate of change "a" at this time denotes a rate of change for when the speed adjustment part 33 changes the vehicle speed V according to the speed command value X from the upper-limit speed Vu before being updated, i.e., the value Vu1 (=80 kph) to the updated upper-limit speed Vu, i.e., the value Vu2 (=70 kph). Therefore, in the same manner as that of FIG. 3, because the rate of change "b" is determined to be less than the rate of change "a", the period of time (t40-t42) required for the vehicle speed V to reach the vehicle speed value Vc at the rate of change "b" is greater than the period of time (t40-t41) required for the vehicle speed V to reach the vehicle speed value Vc at the rate of change "a". In other words, the vehicle speed V decreasing at the rate of change "b" changes more gently than that of the case of decreasing at the rate of change "a". Therefore, it is possible to ease a feeling of the driver that something is wrong.

FIG. 7 is a flowchart illustrating one example of operations of the vehicle speed control apparatus 30. The speed adjustment part 33 carries out a determination in step S20 when the upper-limit speed Vu is updated due to a change in the speed limit Vr of the road (step S10).

In step S20, the speed adjustment part 33 determines which one of the speed command value X generated by the speed command generation part 31 and the limit command value Y generated by the limit command generation part 32 is such a command value as to cause the lower vehicle speed V. If the upper-limit speed Vu is updated due to a change in the speed limit Vr of the road while the speed adjustment part 33 is adjusting the vehicle speed V according to the speed command value X (YES in step S20), the speed adjustment part 33 changes the vehicle speed V at the rate of change "a" such as to not reduce the rate of change in the vehicle speed V (step S30). On the other hand, if the upper-limit speed Vu is updated due to a change in the speed limit Vr of the road while the speed adjustment part 33 is adjusting the vehicle speed V according to the limit command value Y, the speed adjustment part 33 changes the vehicle speed V at the rate of change "b" such as to reduce the rate of change in the vehicle speed V (step S40). Thus, the speed adjustment part 33 changes the vehicle speed V at the rate of change "b" by supplying an instruction to indicate, as described above, at least one of the speed, the acceleration, the driving force, the throttle valve opening, and the engine speed.

The speed adjustment part 33 continuously changes the vehicle speed V at the rate of change "b" in step S50 until the predetermined timing. Then, the speed adjustment part 33 stops changing the vehicle speed V at the rate of change "b" at the predetermined timing. Thus, the speed adjustment part 33 terminates reducing the rate of change in the vehicle speed V. Thus, it is possible to make a change in the vehicle speed V gentler until the predetermined timing.

The predetermined timing is, for example, a timing coming after the vehicle speed reaches a convergence value (i.e., the vehicle speed value Vc) when the speed adjustment part 33 adjusts the vehicle speed V according to such a command value as to cause the lower vehicle speed V after the upper-limit speed Vu is updated. In other words, the speed adjustment part 33 changes the vehicle speed V at the rate of change "b" at least until a timing at which the vehicle speed V reaches the vehicle speed value Vc. Thereby, it is possible to make a change in the vehicle speed V gentler at least until the vehicle speed V reaches the vehicle speed value Vc.

Alternatively, the predetermined timing can be such as, for example, a timing at which a predetermined period of time has elapsed since the speed adjustment part 33 started limiting the rate of change of the vehicle speed V (i.e., since changing the vehicle speed V at the rate of change "b" was started). Thereby, it is possible to make a change in the vehicle speed V gentler until the predetermined period of time elapses. For example, in a case of FIG. 3, the speed adjustment part 33 is changing the vehicle speed V at the rate of change "b" from the updating timing t10 at which changing the vehicle speed V at the rate of change "b" is started to a timing t13 at which the predetermined period of time elapses. The timing t13 is a timing coming before the vehicle speed V reaches the vehicle speed value Vc. After the timing t13, the speed adjustment part 33 is changing the vehicle speed V at the rate of change "a" to the vehicle speed value Vc (see FIG. 8). Timings t23, t33, and t43, shown in FIGS. 4-6, respectively, are the same as the above-mentioned timing t13 (see FIGS. 8-11). Thus, at the beginning at which the vehicle speed V starts changing, it is possible to regard as important easing the driver's feeling that something is wrong; whereas, thereafter, it is possible to rapidly converge the vehicle speed V at the vehicle speed value Vc.

Thus, the vehicle speed control apparatuses and the vehicles have been described in the embodiments. However, the present disclosure is not limited to these embodiments. Various modifications and/or improvements such as combinations with part or all of another embodiment(s), a replacement(s) with part of another embodiment(s), and so forth, can be made.

For example, a "rate of change" denotes a variation of the vehicle speed V per unit period of time. In this regard, when the vehicle speed V is changed at a "rate of change", the vehicle speed V can be changed at the rate of change linearly as shown in the drawings, can be changed at the rate of change curvilinearly, or can be changed at the rate of change stepwise.

Thus, according to the embodiments, if the accelerator pedal is trodden so much as to exceed the determined speed limit of the road, the speed adjustment part adjusts the vehicle speed according to the limit command value. Therefore, the vehicle speed is kept at the upper-limit speed. Even if, while the vehicle speed is thus kept at the upper-limit speed, the upper-limit speed of the vehicle is updated due to a change in the speed limit of the road so that the vehicle speed automatically starts changing, the rate of change of the vehicle speed is limited continuously until a predetermined timing. Therefore, it is possible to ease a feeling of the driver that something is wrong.

What is claimed is:

1. A vehicle speed control apparatus, comprising one or more processors configured to carry out:

generating a speed command value to control a vehicle speed according to a detected treading amount of an accelerator pedal;

determining an upper-limit speed of the vehicle according to a determined speed limit of a road;

generating a limit command value to control the vehicle speed to become the upper-limit speed determined by the determining; and adjusting the vehicle speed according to one of the speed command value and the limit command value to cause the lower vehicle speed, wherein if the determining updates the upper-limit speed due to a change in the speed limit of the road while the adjusting is adjusting the vehicle speed according to the limit command value, the adjusting limits a rate of change of the vehicle speed continuously until a predetermined timing, wherein the predetermined timing is a timing coming after the vehicle speed reaches a convergent value of the vehicle speed to be reached when the adjusting adjusts the vehicle speed according to the one of the speed command value and the limit command value to cause the lower vehicle speed after the upper-limit speed is updated.

2. A vehicle speed control apparatus, comprising one or more processors configured to carry out:

generating a speed command value to control a vehicle speed according to a detected treading amount of an accelerator pedal;

determining an upper-limit speed of the vehicle according to a determined speed limit of a road;

generating a limit command value to control the vehicle speed to become the upper- limit speed determined by the determining; and adjusting the vehicle speed according to one of the speed command value and the limit command value to cause the lower vehicle speed, wherein if the determining updates the upper-limit speed due to a change in the speed limit of the road while the adjusting is adjusting the vehicle speed according to the limit command value, the adjusting limits a rate of change of the vehicle speed continuously until a predetermined timing, wherein the predetermined timing is a timing at which a predetermined period of time has elapsed since the adjusting started the limiting the rate of change of the vehicle speed.

3. The vehicle speed control apparatus as claimed in claim 2, wherein the adjusting terminates the limiting the rate of change of the vehicle speed after the predetermined period of time has elapsed, and thereafter changes the vehicle speed at a greater rate.

4. A vehicle, comprising:

the vehicle speed control apparatus as claimed in claim 1;

a treading amount detection part detecting the treading amount of the accelerator pedal;

a speed limit determination part determining the speed limit of the road; and a power train driving wheels by power according to a control signal that is output by the adjusting.

5. A vehicle, comprising:

the vehicle speed control apparatus as claimed in claim 2;

a treading amount detection part detecting the treading amount of the accelerator pedal;

a speed limit determination part determining the speed limit of the road; and a power train driving wheels by power according to a control signal that is output by the adjusting.

6. A vehicle, comprising:

the vehicle speed control apparatus as claimed in claim 3;

a treading amount detection part detecting the treading amount of the accelerator pedal;

a speed limit determination part determining the speed limit of the road; and a power train driving wheels by power according to a control signal that is output by the adjusting.

* * * * *